(12) United States Patent
Jalalpoor et al.

(10) Patent No.: US 8,876,922 B2
(45) Date of Patent: Nov. 4, 2014

(54) TREATMENT OF BIOFUELS

(75) Inventors: Massoud Jalalpoor, Schifferstadt (DE);
Vasilios Zafirakis, Worms (DE)

(73) Assignee: Grace GmbH & Co. KG, In der Hollerhecke, Worms (DE)

( * ) Notice: Subject to any disclaimer, the term of this patent is extended or adjusted under 35 U.S.C. 154(b) by 678 days.

(21) Appl. No.: 12/808,913

(22) PCT Filed: Dec. 18, 2008

(86) PCT No.: PCT/EP2008/010835
§ 371 (c)(1),
(2), (4) Date: Jun. 17, 2010

(87) PCT Pub. No.: WO2009/080287
PCT Pub. Date: Jul. 2, 2009

(65) Prior Publication Data
US 2010/0313468 A1    Dec. 16, 2010

Related U.S. Application Data

(60) Provisional application No. 61/008,671, filed on Dec. 21, 2007.

(51) Int. Cl.
| | | |
|---|---|---|
| C10L 1/10 | (2006.01) | |
| C10L 1/19 | (2006.01) | |
| B01D 15/00 | (2006.01) | |
| B01J 20/08 | (2006.01) | |
| B01J 20/10 | (2006.01) | |
| C10L 1/02 | (2006.01) | |
| C11C 3/00 | (2006.01) | |
| C11C 1/08 | (2006.01) | |
| C10G 25/00 | (2006.01) | |
| C11C 3/10 | (2006.01) | |

(52) U.S. Cl.
CPC ............... *C10G 25/003* (2013.01); *C10L 1/026* (2013.01); *C11C 3/003* (2013.01); *C11C 1/08* (2013.01); *C11C 3/10* (2013.01); *Y02E 50/13* (2013.01)
USPC ................ 44/388; 44/300; 44/629; 502/400; 502/407; 502/415

(58) Field of Classification Search
USPC ................ 554/174; 502/33, 400, 407, 415; 44/300, 388, 629
See application file for complete search history.

(56) References Cited

U.S. PATENT DOCUMENTS

| | | | |
|---|---|---|---|
| 3,472,786 A | 10/1969 | Urban et al. | 252/414 |
| 4,049,686 A | 9/1977 | Ringers et al. | 260/424 |
| 4,273,621 A | 6/1981 | Fornoff | 203/19 |

(Continued)

FOREIGN PATENT DOCUMENTS

| | | | | |
|---|---|---|---|---|
| EP | 0185182 | 1/1992 | | C11B 3/10 |
| EP | 0507217 | 10/1992 | | C11B 3/10 |

(Continued)

OTHER PUBLICATIONS

Fats & Oils by Clyde E. Stauffer; Eagan Press Handbook Series, 1996.

*Primary Examiner* — Prem C Singh
*Assistant Examiner* — Chantel Graham
(74) *Attorney, Agent, or Firm* — Beverly J. Artale

(57) ABSTRACT

A process, adsorbent and apparatus for treating biofuel is disclosed.

20 Claims, 4 Drawing Sheets

(56) References Cited

U.S. PATENT DOCUMENTS

| | | | |
|---|---|---|---|
| 4,310,440 A | 1/1982 | Wilson et al. | 252/435 |
| 4,319,057 A | 3/1982 | Kiser | 568/916 |
| 4,440,871 A | 4/1984 | Lok et al. | 502/214 |
| 4,562,165 A | 12/1985 | Wilson | 502/33 |
| 4,567,027 A | 1/1986 | Detournay et al. | 423/101 |
| 4,588,745 A | 5/1986 | Bessler | 514/552 |
| 4,599,143 A | 7/1986 | Stage | 203/6 |
| 4,601,790 A | 7/1986 | Stage | 203/6 |
| 4,609,500 A | 9/1986 | Strecker | 260/423 |
| 4,613,410 A | 9/1986 | Rivers, Jr. | 203/39 |
| 4,629,588 A | 12/1986 | Welsh et al. | 260/428 |
| 4,698,185 A | 10/1987 | Dijkstra et al. | 260/403 |
| 4,726,818 A | 2/1988 | Yeung et al. | 55/33 |
| 4,734,226 A | 3/1988 | Parker et al. | 260/420 |
| 4,804,555 A | 2/1989 | Marschner et al. | 426/601 |
| 4,880,574 A | 11/1989 | Welsh | 260/428 |
| 4,927,544 A | 5/1990 | van Opstal et al. | 210/712 |
| 4,939,115 A | 7/1990 | Parker et al. | 502/401 |
| 4,971,660 A | 11/1990 | Rivers, Jr. | 203/40 |
| 4,996,072 A | 2/1991 | Marschner et al. | 426/417 |
| 5,008,047 A | 4/1991 | Martens | 260/424 |
| 5,069,829 A | 12/1991 | Van Dalen et al. | 260/428 |
| 5,079,208 A | 1/1992 | Lammers et al. | 502/238 |
| 5,231,201 A | 7/1993 | Welsh et al. | 554/191 |
| 5,239,096 A | 8/1993 | Rohdenburg et al. | 554/176 |
| 5,264,597 A | 11/1993 | Van Dalen et al. | 554/191 |
| 5,298,638 A | 3/1994 | Toeneboehn et al. | 554/191 |
| 5,298,639 A | 3/1994 | Toeneboehn et al. | 554/192 |
| 5,308,365 A | 5/1994 | Kesling, Jr. et al. | 44/447 |
| 5,336,794 A | 8/1994 | Pryor et al. | 554/206 |
| 5,449,797 A | 9/1995 | Estes et al. | 554/191 |
| 5,525,126 A | 6/1996 | Basu et al. | 44/308 |
| 5,532,392 A | 7/1996 | Gheorghiu | 554/169 |
| 5,578,090 A | 11/1996 | Bradin | 44/308 |
| 5,626,756 A | 5/1997 | Heidlas et al. | 210/634 |
| 5,696,278 A | 12/1997 | Segers | 554/176 |
| 5,713,965 A | 2/1998 | Foglia et al. | 44/388 |
| 5,948,209 A | 9/1999 | Hall Taylor | 159/4.4 |
| 6,015,440 A | 1/2000 | Noureddini | 44/388 |
| 6,111,120 A | 8/2000 | Myers | 554/189 |
| 6,172,248 B1 | 1/2001 | Copeland et al. | 554/190 |
| 6,242,620 B1 | 6/2001 | Elsasser et al. | 554/170 |
| 6,346,286 B1 | 2/2002 | Council et al. | 426/330.6 |
| 6,398,707 B1 | 6/2002 | Wu et al. | 584/169 |
| 6,447,557 B1 | 9/2002 | Yeh et al. | 44/437 |
| 6,797,172 B2 | 9/2004 | Koseoglu et al. | 210/651 |
| 6,953,499 B2 | 10/2005 | Kellens et al. | 96/181 |
| 7,045,100 B2 | 5/2006 | Ergun et al. | 422/129 |
| 2004/0034244 A1* | 2/2004 | Bournay et al. | 554/174 |
| 2005/0081436 A1 | 4/2005 | Bertram et al. | 44/605 |
| 2005/0188607 A1 | 9/2005 | Lastella | 44/605 |
| 2006/0269464 A1 | 11/2006 | Turkay et al. | 423/331 |
| 2007/0088182 A1 | 4/2007 | Hilaly et al. | 568/916 |
| 2008/0318763 A1* | 12/2008 | Anderson | 502/33 |
| 2009/0300972 A1 | 12/2009 | Jalalpoor et al. | 44/308 |

FOREIGN PATENT DOCUMENTS

| | | | |
|---|---|---|---|
| EP | 507424 | 10/1992 | C11B 3/06 |
| EP | 1541527 | 6/2005 | C01C 1/02 |
| FR | 2188612 | 1/1974 | C11B 3/00 |
| GB | 2122588 | 1/1984 | B01J 20/34 |
| GB | 2125812 | 3/1984 | C11B 3/10 |
| GB | 1288806 | 9/2007 | C01B 33/30 |
| JP | 200791852 | 4/2007 | |
| KR | 1020060029671 | 4/2006 | |
| WO | WO2005037969 | * 4/2005 | |
| WO | 2005063954 | 7/2005 | C11C 3/00 |
| WO | 2007100499 | 9/2007 | C10G 25/02 |
| WO | 2008101032 | 8/2008 | C11B 3/10 |
| WO | 2009002878 | 12/2008 | C10L 1/32 |

* cited by examiner

TREATMENT OF BIOFUELS

CROSS REFERENCE TO RELATED APPLICATION

This application is a continuation of U.S. Patent Application Ser. No. 61/008,671.

FIELD OF THE INVENTION

The present invention is directed to a process for treating biofuels and an apparatus for treating biofuels.

BACKGROUND OF THE INVENTION

There is a need in the art for methods of efficiently and effectively purifying and drying biofuels. In addition, there is a need in the art for methods of treating biofuels in a cost-effective manner.

SUMMARY OF THE INVENTION

The present invention relates to the discovery of methods of treating biofuels by purification and drying such that they conform to certain required specifications in the industry.

In one exemplary embodiment, the present invention relates to a process for treating alkyl ester including, contacting a fluid comprising the biofuel with an adsorbent, wherein the adsorbent comprises at least two different metal oxides.

In another exemplary embodiment, the present invention is directed to a process for treating biofuel including, contacting a fluid comprising the biofuel with an adsorbent, and regenerating the adsorbent.

In a further exemplary embodiment, the present invention relates to a process for treating biofuel including, contacting a fluid comprising the biofuel with a polar solvent utilized in the manufacture of the biofuel.

In an even further exemplary embodiment, the present invention is directed to a process for treating biofuel including, contacting a fluid comprising the fatter acid ester with a first adsorbent, contacting the fluid with a second adsorbent, and regenerating the first and the second adsorbents.

In another exemplary embodiment, the present invention is directed to an adsorbent for treating biofuel comprising at least two different metal oxides.

In a further exemplary embodiment, the present invention relates to an apparatus for treating biofuel including, a vessel comprising an adsorbent wherein the adsorbent includes at least two different metal oxides. In a preferred embodiment, the adsorbent may be in the form of a fixed bed.

In an even further exemplary embodiment, the present invention is directed to an adsorbent for treating biofuels including a first inorganic metal oxide adsorbent combined with a second inorganic metal oxide adsorbent having a composition different from the first metal oxide adsorbent. The first metal oxide adsorbent may be in the form of a layer that is contiguous with a layer of the second metal oxide adsorbent, or it may be between layers of the second metal oxide adsorbent, or it may be between a layer of the second metal oxide adsorbent and a layer of one or more metal oxide adsorbents.

These and other features and advantages of the present invention will become apparent after a review of the following detailed description of the disclosed embodiments and the appended claims.

DETAILED DESCRIPTION OF THE INVENTION

Figure 1:
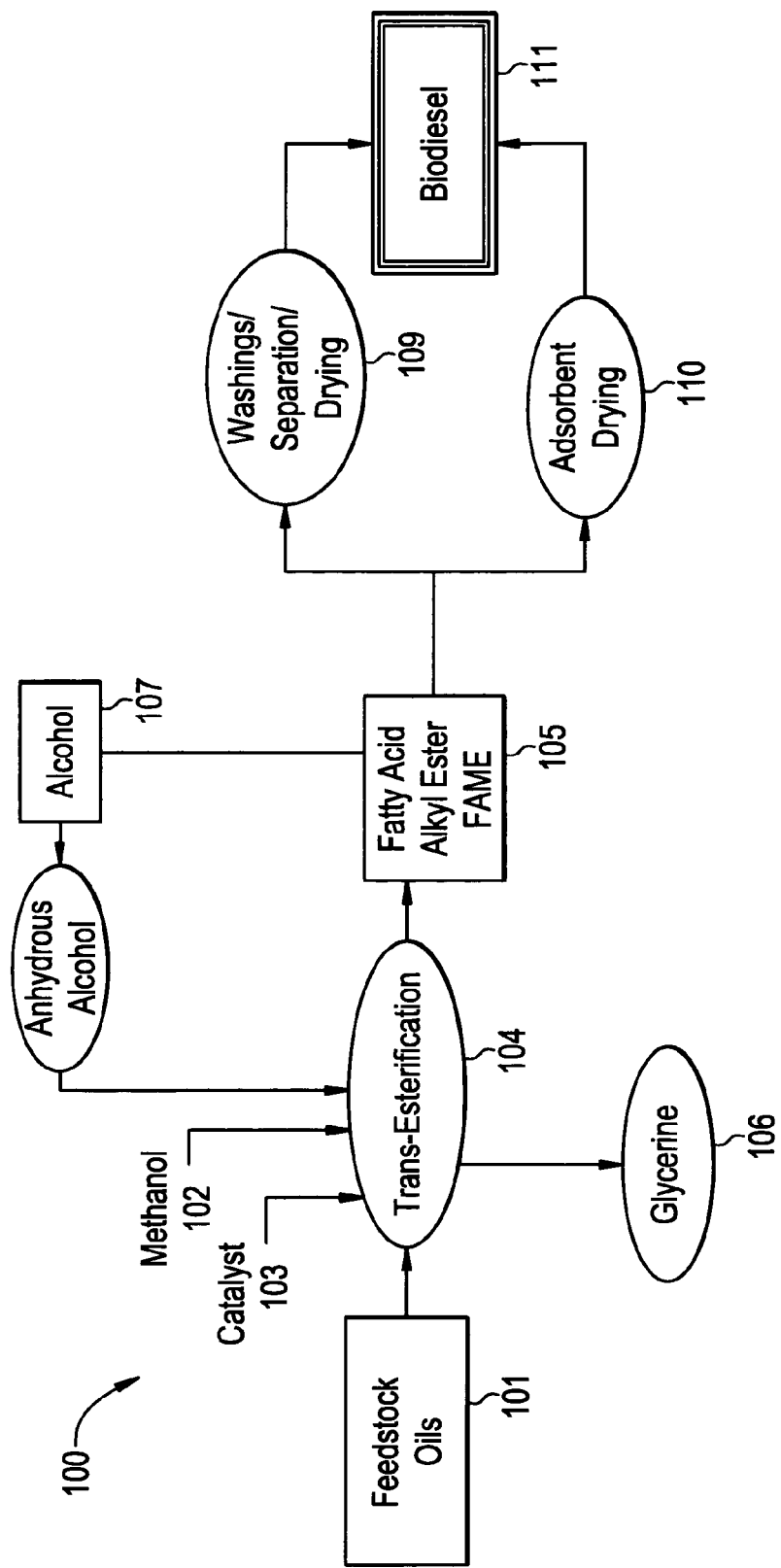
FIG. 1 depicts a flow diagram of an exemplary method of making a biodiesel fuel.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a composition, concentrations, volumes, process temperatures, process times, recoveries or yields, flow rates, and like values, and ranges thereof, employed in describing the embodiments of the disclosure, refers to variation in the numerical quantity that can occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents to these quantities.

As used herein, the term "metal oxides" is defined as oxides of metals or metalloids. Metals include those elements on the left of the diagonal line drawn from boron to polonium on the periodic table. Metalloids or semi-metals include those elements that are on this line. Examples of metal oxides include silica, alumina, titania, alumino silicate and mixtures thereof.

As used herein, "fatty material" is defined as materials derived from plant or animal material that consist mainly of organic molecules comprising fatty acid moieties, such as oils and fats that include glycerides. Fats or oils may comprise butterfat, cocoa butter, cocoa butter substitutes, illipe fat, kokum butter, milk fat, mowrah fat, phulwara butter, sal fat, shea fat, borneo tallow, lard, lanolin, beef tallow, mutton tallow, tallow or other animal fat, canola oil, castor oil, coconut oil, coriander oil, corn oil, cottonseed oil, hazlenut oil, hempseed oil, linseed oil, mango kernel oil, meadowfoam oil, neats foot oil, olive oil, palm oil, palm kernel oil, palm olein, palm stearin, palm kernel olein, palm kernel stearin, peanut oil, rapeseed oil, rice bran oil, safflower oil, sasanqua oil, soybean oil, sunflower seed oil, tall oil, tsubaki oil, vegetable oils, marine oils which can be converted into plastic or solid fats such as menhaden, candlefish oil, cod-liver oil, orange roughy oil, pile herd, sardine oil, whale and herring oils, 1,3-dipalmitoyl-2-monooleine (POP), 1(3)-palmitoyl-3(1)-stearoyl-2-monooleine (POSt), 1,3-distearoyl-2-monooleine (StOSt), triglyceride, diglyceride, monoglyceride, behenic acid triglyceride, trioleine, tripalmitine, tristearine, glycerides of medium chain fatty acids, or combinations thereof.

The term "glycerides" as used herein includes those molecules given by the chemical formula $CH_2RCHR'CH_2R''$ wherein R, R' and R'' are alcohols (OH) or fatty acid groups given by —OC(=O)R''', wherein R''' is a saturated, unsaturated or polyunsaturated, straight or branched carbon chain with or without substituents. R, R', R'' and the fatty acid groups on a given glyceride can be the same or different. The acid groups R, R' and R'' can be obtained from any of the free fatty acids described herein. Glycerides for the present invention include triglycerides in which R, R' and R'' are all fatty acid groups, diglycerides in which two of R, R' and R'' are fatty acid groups and one alcohol functionality is present; monoglycerides in which one of R, R' and R'' is a fatty acid group and two alcohol functionalities are present; and glycerol in which each of R, R' and R'' is an alcohol group. Glycerides useful as starting materials of the invention include natural, processed, refined and synthetic fats and oils. Examples of refined fats and oils are described herein and in Stauffer, C., *Fats and Oils*, Eagan Press, St. Paul, Minn. Examples of processed fats and oils are hydrogenated and fractionated fats and oils.

The terms "fatty acid groups" or "acid groups" both refer to chemical groups given by —OC(=O)R'''. Such "fatty acid groups" or "acid groups" are connected to the remainder of the glyceride via a covalent bond to the oxygen atom that is singly bound to the carbonyl carbon. In contrast, the terms "fatty acid" or "free fatty acid" both refer to HOC(=O)R''' and are not covalently bound to a glyceride. In "fatty acid groups," "acid groups," "free fatty acids," and "fatty acids," R''' is a saturated, unsaturated or polyunsaturated, straight or branched carbon chain with or without substituents, as discussed herein. The skilled artisan will recognize that R''' of the "free fatty acids" or "fatty acids" (i.e., HOC(=O)R''') described herein are useful as R''' in the "fatty acid groups" or "acid groups" attached to the glycerides or to other esters used as fatty materials in the present invention. That is, a fatty material of the present invention may comprise fats, oils or other esters having fatty acid groups formed from the free fatty acids or fatty acids discussed herein.

As used herein, the term "alkyl ester" is defined as alkyl ester derivatives of fats and oils, which may be used as neat diesel fuel or diesel fuel extenders (i.e., biodiesel). The term "biodiesel" includes lower alkyl esters of fatty acid groups found on animal or vegetable glycerides. Lower alkyl esters include methyl ester, ethyl ester, n-propyl ester, and isopropyl ester. In the materialion of biodiesel, the initial fatty material comprises fats or oils and is deodorized as described herein. One or more lower alcohols (e.g., methanol, ethanol, n-propanol and isopropanol) are added to this fatty material and the mixture then comes into contact with enzyme. The enzyme causes the alcohols to be esterified with the fatty acid groups, which is part of the fat or oil glycerides. For example, R, R' or R'' on a glyceride is a fatty acid group given by —OC(=O)R'''. Upon esterification of methanol, the biodiesel material is $CH_3C(=O)R'''$. Biodiesel materials also include esterification of lower alcohols with free fatty acids or other esters, which are added to fats and oils. Esterification also includes processes pertaining to the manufacture of biodiesel, such as discussed in U.S. Pat. Nos. 5,578,090; 5,713,965; and 6,398,707, the entire subject matter of which is incorporated herein by reference.

As used herein, the term "adsorbent" is defined as any commercially available adsorbent material that may be used for contacting the degummed glycerides, including natural or synthetic adsorbents comprising organic (e.g., natural and synthetic polymers, etc.) and/or inorganic materials (e.g. metal oxides such as clay, silica, alumina, etc.). Examples include natural minerals, processed/activated minerals, montmorillonite, attapulgite, bentonite, palygorskite, Fuller's earth, diatomite, smectite, hormite, quartz sand, limestone, kaolin, ball clay, talc, pyrophyllite, perlite, sodium silicate, sodium aluminum silicate, magnesium silicate, magnesium aluminum silicate, silica hydrogel, silica gel, colloidal silica, fumed silica, precipitated silica, dialytic silica, fibrous materials, cellulose, cellulose esters, cellulose ethers, microcrystalline cellulose; alumina, zeolite, starches, molecular sieves, diatomaceous earth, ion exchange resin, size exclusion chromatography resin, chelating resins, rice hull ash, reverse phase silica, bleaching Clay, and all types of activated carbons, and mixtures thereof. Commercially available silica particles include, but are not limited to, TriSyl® silica hydrogel particles commercially available from W.R. Grace (Columbia, Md.). A description of TriSyl® silica hydrogel particles may be found in U.S. Pat. Nos. 5,336,794, 5,231,201, 4,939,115, 4,734,226, and 4,629,588, the subject matter of each of which is hereby incorporated by reference in its entirety. Molecular sieves or zeolites may comprise silica and alumina in different ratios and forms, and may also include a further metal cation. The zeolites may have a three dimensional network of structural units including $SiO_4$ and $AlO_4$ tetrahedrons linked to each other by sharing apical oxygen atoms. Silicon and aluminum atoms lie in the center of the tetrahedral. The alumino-silicate structure is highly porous and possesses three-dimensional pores that may be accessed through molecular sized windows. In the hydrated state, the zeolites may be represented by the formula $M_{2/n}O:Al_2O_3:xSiO_2:yH_2O$ where M is a metal cation, n is the valency of the cation, and x and y represent the moles of silica and water, respectively. Such zeolites include may include chabazite (zeolite D), clinoptilolite, erionite, faujasite (zeolite X and zeolite Y), ferrierite, mordenite, zeolite A, zeolite P, etc., and are set forth in U.S. Pat. Nos. 4,440,871; 4,310,440; and 4,567,027, the entire subject matter of which are incorporated herein by reference.

As used herein, the term "biofuel" is defined as solid, liquid, or gas fuel consisting of, or derived from biomass. In the present application, biofuel is preferably in the form of liquid or gas fuel derived from biomass. Examples include alkyl esters and alcohols.

As used herein, the term "impurities" is defined as water, mono, di, tri-glycerides, residual alcohol, free glycerin, soaps, solids such as catalysts, phospholipids, and metals such as Ca, Mg, Na and K.

In one exemplary embodiment according to the present invention, biodiesel is utilized as the biofuel. Biodiesel precursors and biodiesel fuel may be produced using the process set forth in copending U.S. Patent Application Ser. No. 60/777,303, the entire subject matter of which is incorporated herein by reference.

Alternatively, biofuel including alkyl ester may be produced by a variety of techniques and processes such as those described in U.S. Pat. Nos. 5,525,126; 5,532,392; 5,578,090; 5,713,965; 5,308,365; 6,015,440; and 6,447,557; the entire subject matter of which is incorporated herein by references.

The biodiesel fuel precursor (e.g., feedstock oils), may be further processed so as to produce a biodiesel fuel. In this embodiment, the biodiesel fuel precursor is subjected to a transesterification step, which converts the biodiesel fuel precursor into smaller ester molecules and glycerin. A typical transesterification step involves a reaction as shown below:

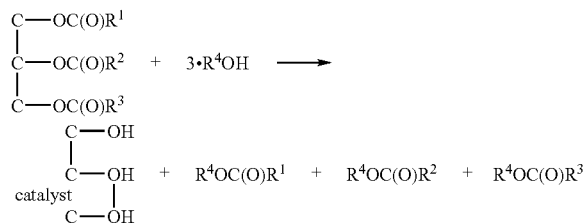

wherein $R^1$, $R^2$ and $R^3$ are each independently an alkyl group having from about 3 to about 22 carbon atoms (more typically from about 12 to about 18 carbon atoms), and $R^4$ is an alkyl group having from about 1 to about 4 carbon atoms (more typically from about 1 to about 2 carbon atoms).

As shown in the transesterification reaction above, three moles of lower alkyl esters (i.e., biodiesel fuel) may be produced from one mole of biodiesel fuel precursor. In the above reaction, a catalyst is used to initiate the reaction. Typically, catalysts used in a transesterification reaction are selected from acids and bases. Suitable catalysts include, but are not limited to, NaOH, KOH, and $NaOCH_3$.

The above reaction suggests that three moles of a lower alkyl alcohol are reacted with a mole of triglyceride. However, it is typically common for more than three moles of lower alkyl alcohol to be used, and more common for about six moles of lower alkyl alcohol to be used per mole of triglyceride in order to push the reaction toward the glycerin/alkyl ester side of the reaction.

Following the transesterification reaction, glycerin is separated from the lower alkyl esters using conventional separation techniques.

Subsequently, alkyl esters are cleaned or purified to remove by-products or impurities (e.g., soaps, water, trace elements, free glycerine) so as to prepare a biodiesel fuel precursor that is suitable for making biodiesel fuel (e.g., that conforms with ASTM D 6751 and DIN EN 14214). The resulting alkyl esters may be used as a biodiesel fuel in combustion engines.

One exemplary method 100 of making biodiesel fuel is depicted in FIG. 1. Biodiesel fuel precursor (e.g., feedstock oil) 101 comprising degummed and purified glycerides is introduced into a reaction vessel (not shown). In addition, one or more lower alkyl alcohols (e.g., methanol, ethanol, or a combination thereof) 102 and a catalyst 103 are introduced into the reaction vessel. A transesterification reaction (i.e., conversion of the precursor to alkyl ester) 104 is initiated and the progress of the reaction between the biodiesel fuel precursor 101 and the one or more lower alkyl alcohols 102 is monitored using conventional process control equipment (not shown). For example, process control equipment may be used to monitor the concentration of one or more of the reactants (e.g., biodiesel precursor 101, alcohol 102, etc.) and/or one or more products (e.g., alkyl ester 105) of the reaction.

A determination is made by process control equipment whether the reaction is completed to a desired degree (e.g., up to complete conversion of the biodiesel fuel precursor 101 to one or more lower alkyl esters 105). If a determination is made that the reaction has not proceeded to a desired degree, the reaction is allowed to continue. If a determination is made that the reaction has proceeded to a desired degree, the reaction mixture containing one or more lower alkyl esters 105 and glycerin 106 (and any unreacted reactants) are introduced to a separation unit (not shown), wherein the one or more lower alkyl esters 105 are separated from the glycerin 106 (and any unreacted reactants, e.g., alcohol) to form a biodiesel fuel. Any unreacted alcohol 107 may be separated and recycled to the reaction 104.

Once the biofuel is prepared, it may be treated by purification and drying such that it conforms to certain required specifications in the industry. Such specifications include EN 14214 and ASTM 6751, which require that the fuel include only certain amounts of water, salts, free glycerine, mono-, di- and tri-glycerides, soaps, sulfurs, and phosphorous. Typically, such purification and drying are performed by washing and separation, with subsequent drying 109. However, in an exemplary embodiment according to the present invention, the washing, separation and drying are replaced with purification and drying 110 using an adsorbent, which provides a pure biodiesel product 111. This eliminates significant manufacturing cost, time and equipment that is required for conventional biodiesel processing.

In one exemplary embodiment, the present invention relates to a process for treating biofuel by contacting a fluid including the biofuel with an adsorbent, wherein the adsorbent comprises at least two different metal oxides. The biofuel may include alkyl esters or alcohols including biodiesel, ethanol, or mixtures thereof. Preferably, the biofuel is biodiesel that includes alkyl esters having fatty acid groups. The metal oxides may include any combination of metal oxides as defined herein, which preferably also remove impurities and moisture. Examples include mixtures of zeolites, silicas, aluminas, or combinations thereof. The metal oxides may be in any form, such as particulates, granules, beads, monoliths, cylinders, extrudates, etc.; and may be formed by any method, including but not limited to, molding, extrusion, mixing, granulation, compacting, or the like. The different metal oxides may combined in a loose or free-flowing admixture, in a fixed bed, co-molded, co-extruded, or combinations thereof. The biofuel may be contacted with the adsorbent in any number of different ways, such by vertical or horizontal fixed bed, reactor/filtration, reactor/packed bed system, radial bed, or other conventional contacting process.

In another exemplary embodiment, the present invention is directed to a process for treating biofuel including, contacting a fluid comprising the biofuel with an adsorbent, and regenerating the adsorbents. The adsorbents may be regenerated by a variety of methods including those set forth in U.S. Patent Application No. 2007/0088182A, the entire subject matter of which is incorporated herein by reference. The regeneration process entails washing the adsorbent with a solvent (e.g., methanol, ethanol, etc.) to remove any impurities from the adsorbent, draining the solvent from the adsorbent and heating the adsorbent while introducing an inert carrier gas (e.g., nitrogen, carbon dioxide, etc., or mixtures thereof) to a temperature sufficient to vaporize water and any residual biofuel on the adsorbent (e.g., 70-200° C.) for a period of time (e.g., 10-90 minutes). Subsequently, the adsorbent is cooled while continuing the flow of inert gas for a period of time (e.g., 10-90 minutes). The adsorbent is then ready for re-use in the treatment of biofuel as set forth herein. The regeneration process may be conducted at any pressure, but is typically performed at atmospheric pressure.

In a further exemplary embodiment, the present invention relates to a process for treating biofuel including contacting a fluid comprising the biofuel with a polar solvent utilized in the manufacture of the biofuel. In this embodiment, the biofuel, such as biodiesel may be produced using a variety of solvents. For example, as mentioned herein, alcohols are typically utilized in excess in the transesterification reaction for the production of biodiesel. The excess unreacted alcohol is removed from the biodiesel product and then separated from any by-products such as by distillation, which can then be recycled for use in the transesterification reaction or utilized in the regeneration process mentioned herein.

In an even further exemplary embodiment, the present invention is directed to a process for treating biofuel including, contacting a fluid comprising the biofuel with a first adsorbent, contacting the fluid with a second adsorbent, and regenerating at least one of the first and the second adsorbents. In a further embodiment, the biofuel may be contacted with at least two adsorbents, such as a third adsorbent. The first second and third adsorbents may be identical in composition, but typically are different. All adsorbents may be housed in the same vessel or in different ones depending on various factors. For example, if the first adsorbent requires more frequent regeneration, then it will be more suitably housed in a different vessel than the second adsorbent. The adsorbents will typically be in the forms and compositions set forth herein. Preferably, the first adsorbent includes a silaceous material and the second adsorbent includes a zeolitic material. When the different adsorbents are in the form of layers, the first and third layers are composed of silaceous material, which may be of the same or different composition or physical structure. The first layer may be composed of a material that protects the zeolitic material from undesired impurities, such as a silica gel, such as TriSyl® silica hydrogel particles commercially available from W. R. Grace (Columbia, Md.). The zeolitic material may be any zeolite type, but is typically a 3A or 4A zeolite. The third layer may be a composed of a silaceous material, such as a xerogel, for example SG 111 available from W.R. Grace (Columbia, Md.).

Figure 2:
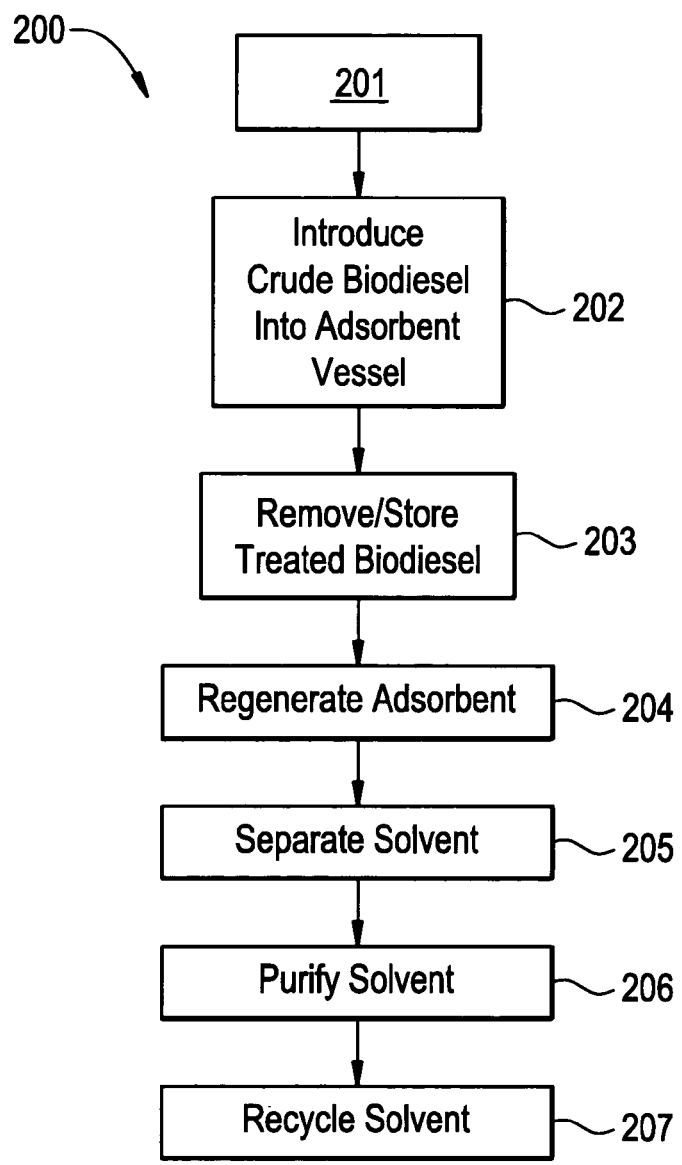
FIG. 2 depicts a flow diagram of an exemplary method of treating a biodiesel fuel according to the present invention.

One exemplary method of treating biodiesel according to the present invention is depicted in FIG. 2. As shown in FIG. 2, exemplary method 200 starts at block 201 and proceeds to step 202, wherein crude biodiesel is subjected to a purification and/or drying process by passing the biodiesel through an adsorbent at a temperature of about 25° C. to about 150° C. at atmospheric pressure or higher (e.g., up to 30 bar). The adsorbent includes those inorganic metal oxide materials referenced herein, and typically include mixtures of these materials. As discussed above, the crude biodiesel contains certain amounts of water, salts, free glycerine, mono-, di- and triglycerides, soaps, sulfurs, and phosphorous, the majority of which are removed by the adsorbent (e.g., reduced to as low as possible according to DIN 14214 and ASTM 6751-03 standards). The adsorbent may be in the form of a packed bed with layers of different adsorbents therein. From step 202, exemplary method proceeds to step 203, wherein the treated biodiesel is stored or transported for distribution. From step 203, exemplary method proceeds to step 204, wherein the adsorbent that is used for the treatment of the crude biodiesel, which is now deactivated, is regenerated. This regeneration process involves the introduction of an organic solvent into the vessel housing the adsorbent at temperatures from about room temperature (e.g., 25° C.) to about 40° C. or 50° C. for a period of about 10 minutes to about 60 minutes and at a pressure of up to about 30 bars. Subsequently, the organic solvent is drained from the adsorbent. The adsorbent is heated to a temperature sufficient vaporize any water and remove any residual organic solvent (e.g., about 70 to about 200° C.), and inert gas (e.g., nitrogen, carbon dioxide, etc.) is introduced into the adsorbent for a period of time (e.g., 10-90 minutes) and at a pressure of up to 30 bars. Subsequently, the adsorbent is cooled while continuing the flow of inert gas for a period of time (e.g., 10-90 minutes). The regeneration conditions may be varied depending on the condition of the adsorbent (i.e., stage of deactivation) and the time desired for regeneration. The adsorbent is then ready for re-use in the treatment of biofuel as set forth herein. The regeneration process may be conducted at any pressure, but is typically performed at atmospheric pressure. The organic solvent utilized in the transesterification process employed in the production of biodiesel may be used in the regeneration step, in which case it may be an alkyl alcohol, such as methanol. In an alternative embodiment, two or more adsorbent vessels may be utilized such that the regeneration process may be conducted in one or more vessels at the same time as the purification and drying process is conducted in one or more other vessels. From step 204, exemplary method proceeds to step 205, wherein the organic solvent stream coming from the adsorbent regeneration process is subjected to a separation process where any residual biodiesel is removed therefrom. From step 205, exemplary method proceeds to step 206, wherein the organic solvent is further treated to remove other impurities, such as by distillation or the like. The organic solvent may then proceed to step 207 where it may be recycled to the regeneration process 204, or even back to the transesterification process used in the biodiesel production.

In a further exemplary embodiment, the present invention relates to an apparatus for treating biofuel including, a vessel comprising an adsorbent wherein the adsorbent includes at least two different metal oxides. In a preferred embodiment, the adsorbent may be in the form of a fixed bed.

Figure 3:
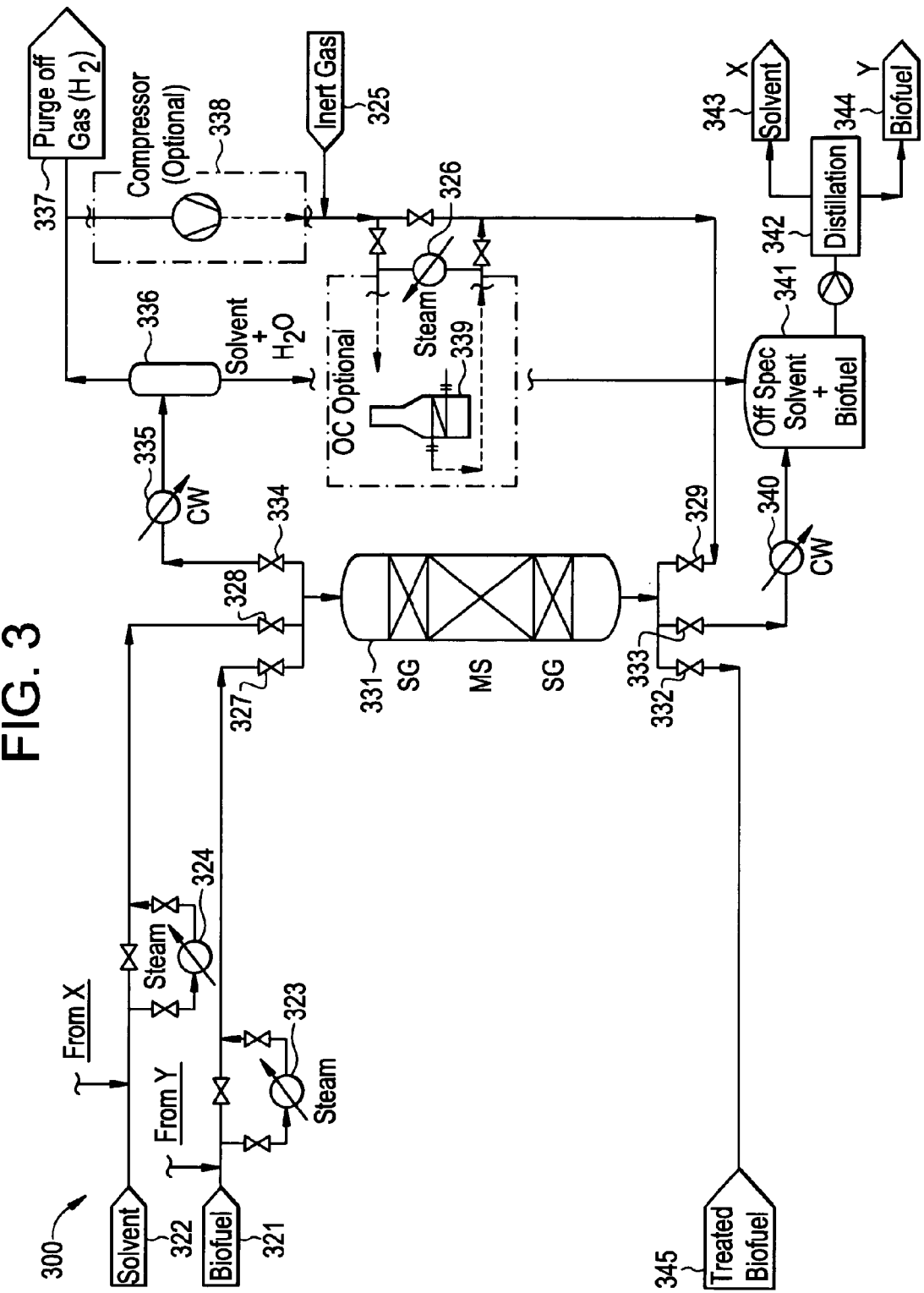
FIG. 3 depicts a schematic diagram of an exemplary apparatus suitable for treating a biodiesel fuel of the present invention.

In one exemplary embodiment, the apparatus for treating the biofuel, such as biodiesel fuel, comprises at least one adsorbent vessel suitable for bringing the biofuel into contact with an adsorbent that not only dries the biofuel but also removes impurities; a device for heating an organic solvent stream (optionally recycled from a biofuel production unit) in-line with the adsorbent vessel(s); a separation device in-line with the adsorbent vessel(s), wherein the separation device is suitable for separating biofuel from the organic solvent; optionally a device for heating an inert gas in-line with the adsorbent vessel(s); and optionally a second separation device in-line with the adsorbent vessel(s), wherein the second separation device is suitable for separating the inert gas from the organic solvent. In order to conduct the biofuel treatment process in a continuous manner, the apparatus may also include conduits/lines suitable for conducting biofuel treatment in one adsorbent vessel and regeneration of deactivated adsorbent in another adsorbent vessel. Additionally, the apparatus may include conduits/lines suitable for recycling organic solvent utilized in a biofuel production unit to the at least one adsorbent vessel in the biofuel treatment apparatus of the present invention. As shown in FIG. 3, exemplary apparatus 300 comprises the following components: untreated biofuel storage container 321; solvent storage container 322; first and second heat exchangers 323 and 324; inert gas storage container 325; third heat exchanger 326; one-way valves 327, 328 and 329 for controlling the flow rate of untreated biofuel, solvent, and inert gas, respectively, into mixing vessel 331; one-way valves 332, 333, and 334 for controlling the flow rate of treated biofuel, off spec biofuel and liquid solvent, and inert gas with entrained solvent off gas, respectively, exiting the mixing vessel 331; fourth heat exchanger 335; separation unit 336 for separating inert gas from solvent; inert gas purge 337; inert gas compressor 338 (optional); for regeneration in closed loop, (saving inert gas), or the use of a fired heater 339 as alternate to steam heater 326 depending on the available sources at the site (optional); fifth heat exchanger 340; off spec biofuel and solvent storage unit 341; separation unit 342 for separating off spec biofuel from solvent; solvent storage unit 343; off spec biofuel storage container 344; treated biofuel storage container 345; and process control unit (not shown) for monitoring the biofuel exiting the adsorbent vessel 331 to determine when the adsorbent is deactivated and providing feedback to one-way valves 327 and 328, so as to regulate the flow of untreated biofuel into and out of the vessel 331 and to one-way valves 328 and 333, so as to regulate flow of solvent into and out of the vessel 331, and for monitoring inert gas entering and exiting the adsorbent vessel 331 to determine when the regeneration of the adsorbent is complete and then providing feedback to one-way valves 329 and 334. In operation, the valves 327 and 332 are opened and untreated biofuel is allowed to enter into vessel 331 so as to produce treated biofuel into container 345. Once the process control unit determines that the adsorbent is deactivated, it closes valves 327 and 332 and opens valves 328 and 333, which allows solvent to enter the vessel 331 and remove impurities from the adsorbent. After the process control unit determines that the solvent exiting the vessel 331 has removed sufficient impurities, it prompts one-way valves 328 and 333 to close and opens one-way valves 329 and 334 that regulate the flow of inert gas into and out of vessel 331. Once adsorbent vessel 331 is regenerated, then the process control unit may be prompted to close one-way valves 329 and 334 and open valves 327 and 332 to enable treatment of biofuel in adsorbent vessel 331.

Although not shown in FIG. 3, solvent may be supplied to storage vessel 322 from unreacted solvent used in a biofuel production apparatus (also not shown) thereby recycling the unreacted solvent. Solvent may also be recycled from solvent storage vessel 343 to solvent vessel 322 and off spec biofuel from storage vessel 344 to untreated biofuel vessel 321.

Figure 4:
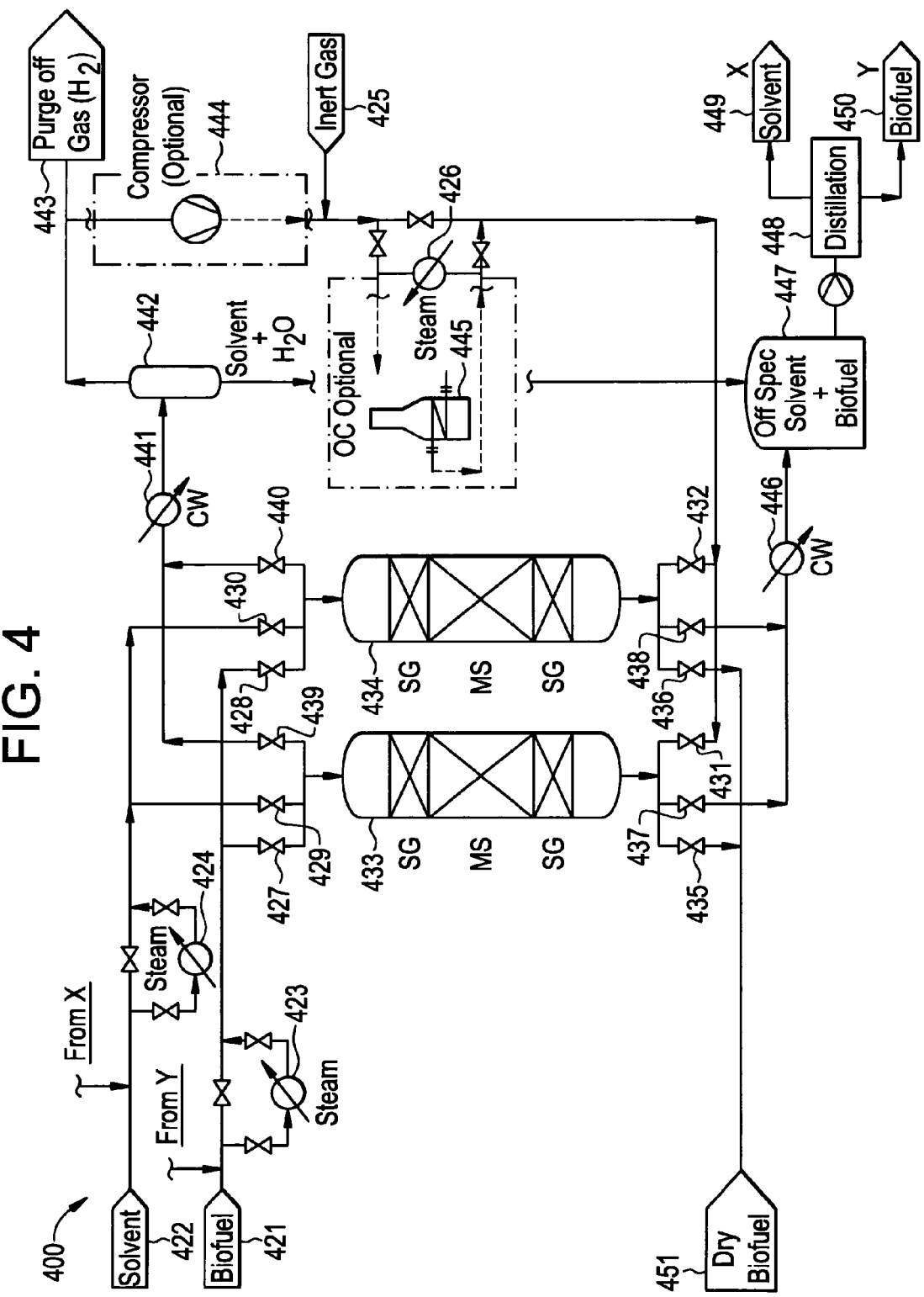
FIG. 4 depicts a schematic diagram of an exemplary apparatus suitable for treating a biodiesel fuel of the present invention.

As shown in FIG. 4, exemplary apparatus 400 comprises the following components: untreated biofuel storage container 421; solvent storage container 422; first and second heat exchangers 423 and 424; inert gas storage container 425; third heat exchanger 426; one-way valves 427 and 428, for controlling the flow rate of untreated biofuel into adsorber vessels 433 and 434; one-way valves 429 and 430 for controlling the flow rate of solvent into adsorber vessels 433 and 434; one-way valves 431 and 432 for controlling the flow rate of inert gas into mixing vessels 433 and 434; one-way valves 435 and 436 for controlling the flow rate of treated biofuel exiting the adsorbent vessels 433 and 434; one-way valves 437 and 438 for controlling the flow rate of off spec biofuel and liquid solvent exiting the adsorbent vessels 433 and 434; one-way valves 439 and 440 for controlling the flow rate of regenerating inert gas with entrained solvent exiting the adsorbent vessels 433 and 434; fourth heat exchanger 441; separation unit 442 for separating inert gas from solvent; inert gas purge 443; inert gas compressor 444 (optional); for regeneration in closed loop (saving inert gas), the use of a fired heater as alternate to steam heater 426 depending on the available resources at the site (optional); fifth heat exchanger 446; off spec biofuel and solvent storage unit 447; separation unit 448 for separating off spec biofuel from solvent; solvent storage unit 449; off spec biofuel storage unit 450; biofuel storage container 451; and process control units (not shown) for monitoring the treated biofuel exiting the adsorbent vessels 433 and 434, respectively, to determine when the adsorbent is deactivated and providing feedback to one-way valves 427, 428, 435 and 436, so as to regulate the flow of untreated biofuel into and out of the vessels 433 and 434, and to one-way valves 429, 430, 437 and 438, so as to regulate the flow of solvent into and out of the vessels 433 and 434 during the regeneration process, and for monitoring inert gas entering and exiting the adsorbent vessels 433 and 434 to determine when the regeneration of the adsorbent is complete and then providing feedback to one-way valves 431, 432, 439 and 440.

In this arrangement, apparatus 400 may be operated continuously such that one of adsorbent vessels, 433 or 434, may be treating biofuel while the other is being regenerated simply by prompting the process control units to open and close the appropriate valves in and out of vessels 433 and 434. For example, if adsorbent vessel 433 is deactivated and is being regenerated, and adsorbent vessel 434 is being utilized to treat biofuel concurrently, then process control unit is prompted to close valves 427 and 435 that regulate the flow of untreated biofuel entering and exiting the vessel 433, and open valves 429 and 437 that regulate the flow of solvent into vessel 433. After the process control unit determines that the solvent exiting the vessel 433 has removed sufficient impurities, it prompts one-way valves 429 and 437 to close and opens one-way valves 431 and 439 that regulate the flow of inert gas into and out of vessel 433. Once adsorbent vessel 433 is regenerated and adsorbent vessel 434 is deactivated, then the process control units may be prompted to reverse the positions of the valves in order to allow for regeneration of adsorbent vessel 434 and enable treatment of biofuel in adsorbent vessel 433. Alternatively, both adsorbent vessels by be controlled to treat biofuel simultaneously and to be also be regenerated simultaneously. Although not depicted in FIG. 4, there may be any number of adsorbent vessels in apparatus 400.

Alternatively, the deactivated adsorbent may be removed from the adsorbent vessel(s) and regenerated in a different vessel or disposed of.

In an even further exemplary embodiment, the present invention is directed to an adsorbent for treating biofuel including a first inorganic metal oxide in the form of a layer that is between layers of a second inorganic metal oxide. Preferably, the first inorganic metal oxide is composed of silaceous material and the second inorganic oxide is composed of zeolitic material and the third composed of silaceous material.

The metal oxides may include any combination of metal oxides as defined herein, which preferably also remove impurities and moisture. Examples include mixtures of zeolites, silicas, aluminas, or combinations thereof. The metal oxides may be in any form, such as particulates, granules, beads, monoliths, cylinders, extrudates, etc.; and may be formed by any method, including but not limited to, molding, extrusion, mixing, granulation, compacting, or the like. The different metal oxides may combined in a loose or free-flowing admixture, in a fixed bed, co-molded, co-extruded, or combinations thereof. The biofuel may be contacted with the adsorbent in any number of different ways, such by vertical or horizontal fixed bed, reactor/filtration, reactor/packed bed system, radial bed, or other conventional contacting process. The adsorbents will typically be in the forms and compositions set forth herein. Preferably, the first adsorbent includes a silaceous material and the second adsorbent includes a zeolitic material. When the different adsorbents are in the form of layers, the first and third layers are composed of silaceous material, which may be of the same or different composition or physical structure. The first layer may be composed of a material that protects the zeolitic material from undesired impurities, such as a silica gel, such as TriSyl® silica hydrogel particles commercially available from W. R. Grace (Columbia, Md.). The zeolitic material may be any zeolite type, but is typically a 3A or 4A zeolite. The third layer may be a composed of a silaceous material, such as a xerogel, for example SG 111 available from W. R. Grace (Columbia, Md.).

In a further embodiment, instead of treating biofuel during its manufacture to purify and dry the biofuel, it may be treated after manufacture, such as after extended storage.

EXAMPLES

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Examples 1-5

Under laboratory scale, 100 g of the crude biodiesel sample obtained from Palm Oil was treated with different adsorbent types (shown in Table 1 below) at various dosage concentrations (0.5%, 1.0% and 2.0%). The biodiesel was heated up to 60° C., adsorbents were added, and the mixture agitated for 15 minutes using a magnetic stirrer, and subsequently filtered to remove adsorbent. The TriSyl® adsorbent treated biodiesel samples were then vacuum dried. The results are shown in Table 1 below. As a reference the crude biodiesel was washed with 10% deionised water.

TABLE 1

| | | Analytical Data: Biodiesel F 895 - FAME from RBD Palm Oil | | | | | | | | | |
|---|---|---|---|---|---|---|---|---|---|---|---|
| | | Trace elements/ppm | | | | | | Soap | PV | | Ranclmat |
| Nr. | Samples | P | Mg | Fe | Ca | Cu | Na | FFA % | ppm | meqO2/kg | AV | h/110° C. |
| 1 | after stripping of methanol | 1.0 | 0.11 | <0.05 | 0.55 | 0.10 | 0.48 | 0.15 | 2076 | 2.17 | 4.01 | n.m. |
| 2 | +10% H2O Example 1 | 1.0 | 0.06 | <0.05 | 0.21 | <0.04 | 0.57 | 0.18 | 21 | 7.88 | 6.66 | 7.0 |
| 3 | 0.5% TriSyl ® + drying | 0.8 | <0.04 | <0.05 | 0.11 | <0.04 | 0.23 | 0.13 | 98 | 5.02 | 4.62 | 17.8 |
| 4 | 1.0% TriSyl ® + drying | | | | | | | 0.15 | 0 | 4.90 | \ | |
| 5 | 2.0% TriSyl ® + drying Example 2 | | | | | | | 0.15 | 0 | 4.24 | 4.34 | 17.1 |
| 6 | 0.5% Sylosiv ® A4(akt.)(FC500) | 1.0 | 0.05 | <0.05 | 0.23 | <0.04 | 0.73 | 0.19 | 0 | 5.05 | 1.98 | 13.5 |
| 7 | 1.0% Sylosiv ® A4(akt.)(FC500) | | | | | | | 0.15 | 0 | 4.72 | \ | |
| 8 | 2.0% Sylosiv ® A4(akt)(FC500) Example 3 | | | | | | | 0.19 | 0 | 5.82 | 2.75 | 13.4 |
| 9 | 0.5% CP2-7887 | 0.8 | <0.04 | <0.05 | 0.11 | 0.04 | 0.39 | 0.20 | 0 | 4.33 | 2.56 | 16.3 |
| 10 | 1.0% CP2-7887 | | | | | | | 0.24 | 0 | 4.53 | \ | |
| 11 | 2.0% CP2-7887 Example 4 | | | | | | | 0.24 | 0 | 3.49 | 4.07 | 16.2 |
| 12 | 0.5% CP2-7887 + 10% Sylosiv ® A4 | 1.0 | <0.04 | <0.05 | 0.15 | <0.04 | 0.38 | 0.23 | 0 | 5.73 | 2.42 | 12.9 |
| 13 | 1.0% CP2-7887 + 10% Sylosiv ® A4 | | | | | | | 0.22 | 0 | 4.47 | \ | |
| 14 | 2.0% CP2-7887 + 10% Sylosiv ® A4 Example 5 | | | | | | | 0.20 | 0 | 4.89 | 3.84 | 15.7 |
| 15 | 0.5% CP2-7887 + 20% Sylosiv ® A4 | 1.0 | <0.04 | <0.05 | 0.14 | <0.04 | 0.45 | 0.21 | 0 | 6.65 | 3.69 | 14.4 |
| 16 | 1.0% CP2-7887 + 20% Sylosiv ® A4 | | | | | | | 0.21 | 0 | 5.03 | \ | |
| 17 | 2.0% CP2-7887 + 20% Sylosiv ® A4 | | | | | | | 0.17 | 0 | 4.57 | 3.86 | 16.4 |

PV = Peroxide Value (indication for primary oxidation products).
AV = Anisidine Value (indication for secondary oxidation product).
FFA = Free Fatty Acid

Example 6

In this Example, a breakthrough test is conducted to determine at what point the adsorbent is exhausted. For this breakthrough test, 250 g of molecular sieve, as 564 C, available from Grace GmbH & Co. KG, was filled into a glass column with a height of 630 mm and an inside diameter of 26 mm. The flow rate of biodiesel through the column was adjusted to 324 kg/h. The inlet temperature of the biodiesel was 50° C. Biodiesel from a customer's plant with a water content of 832 ppm was used. The following Table 2 summarizes the test results.

TABLE 2

| Diesel-amount ml | Time min. | Water-content ppm |
|---|---|---|
| 400 | 6.3 | 32.00 |
| 800 | 12.6 | 33.80 |
| 2800 | 44.1 | 33.29 |
| 3600 | 56.7 | 34.00 |
| 4200 | 66.1 | 48.00 |
| 4600 | 72.4 | 60.52 |
| 5400 | 85.0 | 77.76 |
| 7600 | 119.7 | 127.00 |
| 10000 | 157.5 | 178.00 |
| 11200 | 176.4 | 201.90 |
| 13400 | 213.0 | 250.00 |
| 14600 | 241.0 | 276.18 |
| 15800 | 248.8 | 284.00 |
| 17800 | 280.3 | 304.00 |
| 19800 | 311.8 | 320.00 |
| 21400 | 337.0 | 333.00 |
| 23400 | 368.5 | 344.00 |
| 25400 | 400.0 | 353.00 |
| 26600 | 418.9 | 358.00 |
| 27400 | 431.5 | 363.00 |
| 28600 | 454.0 | 366.00 |

Example 7

In this Example, the molecular sieve of Example 6 was regenerated. For the regeneration, 3 samples of 70 g saturated or exhausted molecular sieve (MS 564) were treated as follows:

For Sample 1: After draining of the biodiesel from the glass column, the molecular sieve was activated in a Nitrogen stream at 230° C. for 3 h.

For Sample 2: After removing the molecular sieve from the glass column, it is filled in a beaker containing 79 g of Methanol and was shaken for 5.5 min so that that the molecular sieve was kept moving. After this step the molecular sieve was filled in the activation glass column where it was first purged with Nitrogen for 0.5 h and then activated in a nitrogen stream at 288° C. for 3 hours.

For Sample 3: The biodiesel is processed as Sample 2 but with a shaking time of 11 min.

The following table illustrates the results of the analysis for all 3 Samples.

TABLE 3

|  | Sample 1 | Sample 2 | Sample 3 |
|---|---|---|---|
| MS-type: MS 564C | No Wash with CH3OH N2 activ. (230° C.) | Wash with CH3OH for 5.5 min N2 actt. (230° C.) | Wash with CH3OH for 11 min N2 activ. (230° C.) |

TABLE 3-continued

|  | Sample 1 | Sample 2 | Sample 3 |
|---|---|---|---|
| TV, Gew. % | 5.38 | 4.03 | 3.88 |
| carbon d.b., % | 2.68 | 2.01 | 1.91 |
| H2O-Ads. 10% r.F., Gew. % | | | |
| 1 h | 8.14 | 8.26 | 8.43 |
| 2 h | 11.07 | 11.29 | 11.47 |
| 3 h | 13.14 | 13.41 | 13.60 |
| 4 h | 14.39 | 14.64 | 14.82 |
| 5 h | 15.33 | 15.52 | 15.69 |
| 6 h | 16.00 | 16.10 | 16.24 |
| 24 h | 16.48 | 16.40 | 16.51 |
| Gleichgewicht | 16.48 | 16.40 | 16.51 |
| crush, N | 20.0 | 22.9 | 21.4 |
| Hg-Porosimetrie cumulative volume, mm$^3$/g | 257.94 | — | 336.1 |
| Spezific surface, m$^2$/g | 20.56 | — | 24.7 |
| ave. Porediameter, Å | 1497.5 | — | 2175.3 |

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_u$, is disclosed, any number R falling within the range is specifically disclosed. In particular, the following numbers R within the range are specifically disclosed: $R=R_L+k(R_u-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A process for treating biofuel comprising:
   (a) contacting a fluid comprising the biofuel with a first adsorbent that removes at least one of water and impurities from the fluid, the first adsorbent comprising at least two different metal oxides in the form of a first fixed bed within a first adsorbent vessel; and
   (b) regenerating the first adsorbent with a solvent while positioned within the first adsorbent vessel.

2. The process according to claim 1, wherein said biofuel comprises esters, alcohols or mixtures thereof.

3. The process according to claim 1, wherein each of the metal oxides comprises silica, alumina, aluminosilicate or mixtures thereof.

4. A process for treating biofuel comprising:
   (a) contacting a fluid comprising the biofuel with a first adsorbent that removes water from the fluid;

(b) contacting the fluid with a second adsorbent that removes impurities from the fluid, the first and the second adsorbents being in the form of one or more fixed beds within one or more adsorbent vessels; and (c) regenerating at least one of the first and the second adsorbents with a liquid solvent, said regenerating step occurring within the one or more adsorbent vessels.

5. A process for treating biofuel comprising:

(a) contacting a fluid comprising the biofuel with an adsorbent that removes at least one of water and impurities from the fluid; and (b) regenerating the adsorbent with a polar solvent utilized in the manufacture of the biofuel, said regenerating step comprising:

washing the adsorbent with the polar solvent to remove impurities from the absorbent;

draining the polar solvent from the adsorbent; and heating the absorbent to a temperature sufficient to vaporize water and any residual biofuel on the adsorbent for a time period while blanketing the absorbent with an inert carrier gas, wherein the polar solvent comprises an alcohol, and said washing step comprises introducing the polar solvent into a vessel housing the adsorbent at a temperature ranging from about room temperature to about 50° C. for a period of about 10 minutes to about 60 minutes and at a pressure ranging from atmospheric pressure to about 30 bars.

6. A process for treating alkyl esters comprising:

(a) contacting a fluid comprising the alkyl esters with an adsorbent that removes at least one of water and impurities from the fluid, the adsorbent being in the form of a first fixed bed within a first adsorbent vessel and comprising at least two different metal oxides selected from silica, alumina, aluminosilicate, or mixtures thereof, the at least two different metal oxides comprising a first metal oxide in a layer positioned between a first layer of a second metal oxide and a third layer of the second metal oxide; and (b) regenerating the adsorbent with a solvent within the first adsorbent vessel.

7. The process according to claim 1, wherein the at least two different metal oxides comprise a first metal oxide in a layer positioned between a first layer of a second metal oxide and a third layer of the second metal oxide.

8. The process according to claim 7, wherein the first metal oxide comprises aluminosilicate and the second metal oxide comprises silica.

9. The process according to claim 7, wherein the first layer comprises a first silica and the third layer comprises a second silica having the same composition, shape or physical form of the first silica.

10. The process according to claim 1, wherein said regenerating step comprises:

washing the first adsorbent with the solvent to remove any impurities from the first absorbent;

draining the solvent from the first adsorbent and the first adsorbent vessel; and heating the first absorbent to a temperature sufficient to vaporize water and any residual biofuel on the first adsorbent for a time period while blanketing the first absorbent with an inert carrier gas within the first adsorbent vessel.

11. The process according to claim 10, wherein (i) the solvent comprises methanol or ethanol; (ii) the temperature is from 70° C. to 200° C.; (iii) the time period is 10 to 90 minutes; (iv) the inert gas is nitrogen, carbon dioxide or a mixture thereof; and (v) said regenerating step is performed at a pressure ranging from atmospheric pressure to about 30 bars.

12. The process according to claim 4, wherein the adsorbent comprises at least two different metal oxides.

13. The process according to claim 12, wherein the at least two different metal oxides comprise (i) a layer of zeolitic material comprising silica and alumina positioned between (ii) outer layers of silaceous material.

14. The process according to claim 5, wherein the adsorbent comprises at least two different metal oxides.

15. The process according to claim 14, wherein the at least two different metal oxides comprise (i) a layer of zeolitic material comprising silica and alumina positioned between (ii) outer layers of silaceous material.

16. The process according to claim 1, further comprising:

during said regenerating step, contacting the fluid comprising the biofuel with a second adsorbent that removes at least one of water and impurities from the fluid, the second adsorbent comprising at least two different metal oxides in the form of a second fixed bed within a second adsorbent vessel.

17. The process according to claim 1, further comprising:

during said contacting step, passing the fluid comprising the biofuel through a second adsorbent vessel so as to contact a second adsorbent that removes at least one of water and impurities from the fluid, the second adsorbent comprising at least two different metal oxides in the form of a second fixed bed within the second adsorbent vessel.

18. The process according to claim 1, further comprising:

during said contacting step, regenerating a second adsorbent within a second adsorbent vessel, the second adsorbent being capable of removing at least one of water and impurities from the fluid, the second adsorbent comprising at least two different metal oxides in the form of a second fixed bed within the second adsorbent vessel.

19. The process according to claim 4, wherein the first and the second adsorbents are in the form of a first fixed bed within a first adsorbent vessel, and a second fixed bed within a second adsorbent vessel.

20. The process according to claim 19, wherein at least one of said contacting steps occurs simultaneously with said regenerating step.

* * * * *